(12) United States Patent
Zemskova et al.

(10) Patent No.: US 7,673,446 B2
(45) Date of Patent: Mar. 9, 2010

(54) DUAL PATH EXHAUST EMISSION CONTROL SYSTEM

(75) Inventors: Svetlana Mikhailovna Zemskova, Edelstein, IL (US); Julie Marie Faas, Peoria, IL (US); Christie Susan Ragle, Havana, IL (US); Matthew Owen Stefanick, Peoria, IL (US); Ronald Graham Silver, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 229 days.

(21) Appl. No.: 11/698,815

(22) Filed: Jan. 29, 2007

(65) Prior Publication Data

US 2008/0178579 A1 Jul. 31, 2008

(51) Int. Cl.
*F01N 3/00* (2006.01)

(52) U.S. Cl. .............. 60/286; 60/276; 60/285; 60/287; 60/288; 60/295; 60/297

(58) Field of Classification Search ............ 60/274, 60/276, 285, 287, 288, 295, 297, 303, 324, 60/286

See application file for complete search history.

(56) References Cited

U.S. PATENT DOCUMENTS

| | | | | |
|---|---|---|---|---|
| 5,746,052 | A * | 5/1998 | Kinugasa et al. | 60/274 |
| 5,842,340 | A * | 12/1998 | Bush et al. | 60/274 |
| 5,863,508 | A | 1/1999 | Lachman et al. | |
| 5,912,198 | A | 6/1999 | Feitelberg et al. | |
| 6,047,542 | A | 4/2000 | Kinugasa et al. | |
| 6,105,365 | A * | 8/2000 | Deeba et al. | 60/274 |
| 6,119,452 | A * | 9/2000 | Kinugasa et al. | 60/285 |
| 6,378,298 | B2 | 4/2002 | Harima et al. | |
| 6,708,484 | B2 | 3/2004 | Onodera et al. | |
| 6,820,417 | B2 | 11/2004 | May et al. | |
| 6,823,663 | B2 | 11/2004 | Hammerle et al. | |
| 6,852,666 | B1 | 2/2005 | Bouly et al. | |
| 6,863,874 | B1 | 3/2005 | Twigg | |
| 6,883,310 | B2 | 4/2005 | Nakatani et al. | |
| 7,055,311 | B2 | 6/2006 | Beutel et al. | |
| 7,117,669 | B2 * | 10/2006 | Kaboord et al. | 60/288 |
| 7,334,400 | B2 * | 2/2008 | Yan et al. | 60/286 |
| 2004/0037755 | A1 | 2/2004 | Mital et al. | |
| 2005/0138916 | A1 | 6/2005 | Bonadies et al. | |
| 2006/0096281 | A1 | 5/2006 | Huang | |
| 2007/0079603 | A1 * | 4/2007 | Hu et al. | 60/288 |
| 2007/0130915 | A1 * | 6/2007 | Beckmann et al. | 60/285 |

FOREIGN PATENT DOCUMENTS

| | | |
|---|---|---|
| DE | 100 38 458 | 2/2002 |
| EP | 1 338 770 | 8/2003 |
| JP | 2-277915 | 11/1990 |
| JP | 05 195756 | 8/1993 |

* cited by examiner

*Primary Examiner*—Tu M Nguyen
(74) *Attorney, Agent, or Firm*—Finnegan, Henderson, Farabow, Garrett & Dunner

(57) ABSTRACT

An exhaust emission control system for an internal combustion engine is disclosed. The exhaust emission control system has a first passageway and a second passageway disposed to receive exhaust in parallel. The exhaust emission control system also has a valve arrangement configured to regulate the flow of exhaust to the first and second passageways, and at least one sensor configured to sense a parameter indicative of a constituent of the exhaust. The at least one sensor generates a signal corresponding to the sensed parameter. The exhaust emission control system also has a controller in communication with the valve and the at least one sensor. The controller is configured to affect operation of the valve in response to the signal.

17 Claims, 1 Drawing Sheet

DUAL PATH EXHAUST EMISSION CONTROL SYSTEM

TECHNICAL FIELD

This disclosure relates generally to an exhaust emission control system, and more particularly, to an exhaust emission control system employing a dual path flow for purifying exhaust gas discharge.

BACKGROUND

Engines, including diesel engines, gasoline engines, gaseous fuel-powered engines, and other engines known in the art exhaust a complex mixture of emissions. These emissions may be composed of gaseous compounds, including NO, $NO_2$, CO, $CO_2$, unburned hydrocarbons CxHy, water vapor, $O_2$, and solid carbon particulate matter also known as soot.

The amount of gaseous compounds emitted to the atmosphere from an engine may be regulated depending on the type of engine, size of engine, and/or class of engine. A method implemented by engine manufacturers to comply with the regulation of particulate matter exhausted to the environment includes removing the particulate matter from the exhaust flow of an engine with a device called a particulate trap. Another method that has been implemented by engine manufacturers to comply with the regulation of engine emissions has been to employ various catalysts to purify the exhaust gas from the engine before emitting the gas to the atmosphere. Most catalysts either employ conventional lean NOx mechanisms or on-board ammonia production by urea hydrolysis, known as urea selective catalytic reduction. These mechanisms seek to convert harmful NOx into innocuous constituents such as $N_2$, $CO_2$, and water, and to neutralize or eliminate $NH_3$ slip attributed to the urea selective catalytic reduction aftertreatment system.

One example of utilizing lean NOx mechanisms to purify exhaust emissions is described in U.S. Pat. No. 6,378,298 (the '298 patent) issued to Harima et al. on Apr. 30, 2002. The '298 patent utilizes a conventional lean NOx catalyst to purify the exhaust gas. Specifically, the '298 patent describes a split exhaust flow including a first passageway and a second passageway that both allow exhaust gas to flow from the engine to the catalyst. The '298 patent further discloses a flow controller that controls the amount of exhaust gas flowing from the engine through the first and second passageways based on a temperature of the exhaust gas. The first passageway contains an accelerated cooling portion having a cross section designed to allow a large release of heat from the exhaust gas in the first passageway. The second passageway has a cross section designed to allow a small release of heat from the exhaust gas in the second passageway. The amount of exhaust gas flowing through the first passageway is made larger than that through the second passageway when the temperature of exhaust gas emitted from the engine is to be lowered by a relatively large degree before reaching the catalyst. In contrast, the amount of exhaust gas flowing through the second passageway is made larger than that through the first passageway when the temperature of exhaust gas emitted from the engine is to be lowered by only a small degree before reaching the catalyst.

Although the exhaust purifying system of the '298 patent may reduce the amount of NOx gas exhausted to the environment, it relies exclusively on lean NOx mechanisms to purify exhaust emissions. Thus, the system described in the '298 patent will be ineffective in situations where lean NOx mechanisms alone cannot sufficiently convert harmful emissions into innocuous constituents.

This disclosure is directed to overcoming one or more of the problems set forth above.

SUMMARY OF THE INVENTION

In one aspect, the present disclosure is directed to an exhaust emission control system. The exhaust emission control system includes a first passageway configured to receive exhaust, and a second passageway disposed to receive exhaust in parallel with the first passageway. The exhaust emission control system also includes a valve arrangement configured to regulate the flow of exhaust to the first and second passageways. The exhaust control system further includes at least one sensor configured to sense a parameter indicative of a constituent of the exhaust and to generate a corresponding signal. The exhaust emission control system also includes a controller in communication with the valve and the at least one sensor. The controller is configured to affect operation of the valve in response to the signal.

In another aspect, the present disclosure is directed to a method of controlling exhaust emissions. The method includes generating a flow of exhaust and splitting the exhaust flow into a first flow and a second flow. The method also includes sensing a constituent within the flow of exhaust and regulating the ratio of exhaust flow split between the first and second flows based on the sensed constituent.

DETAILED DESCRIPTION

Figure 1:
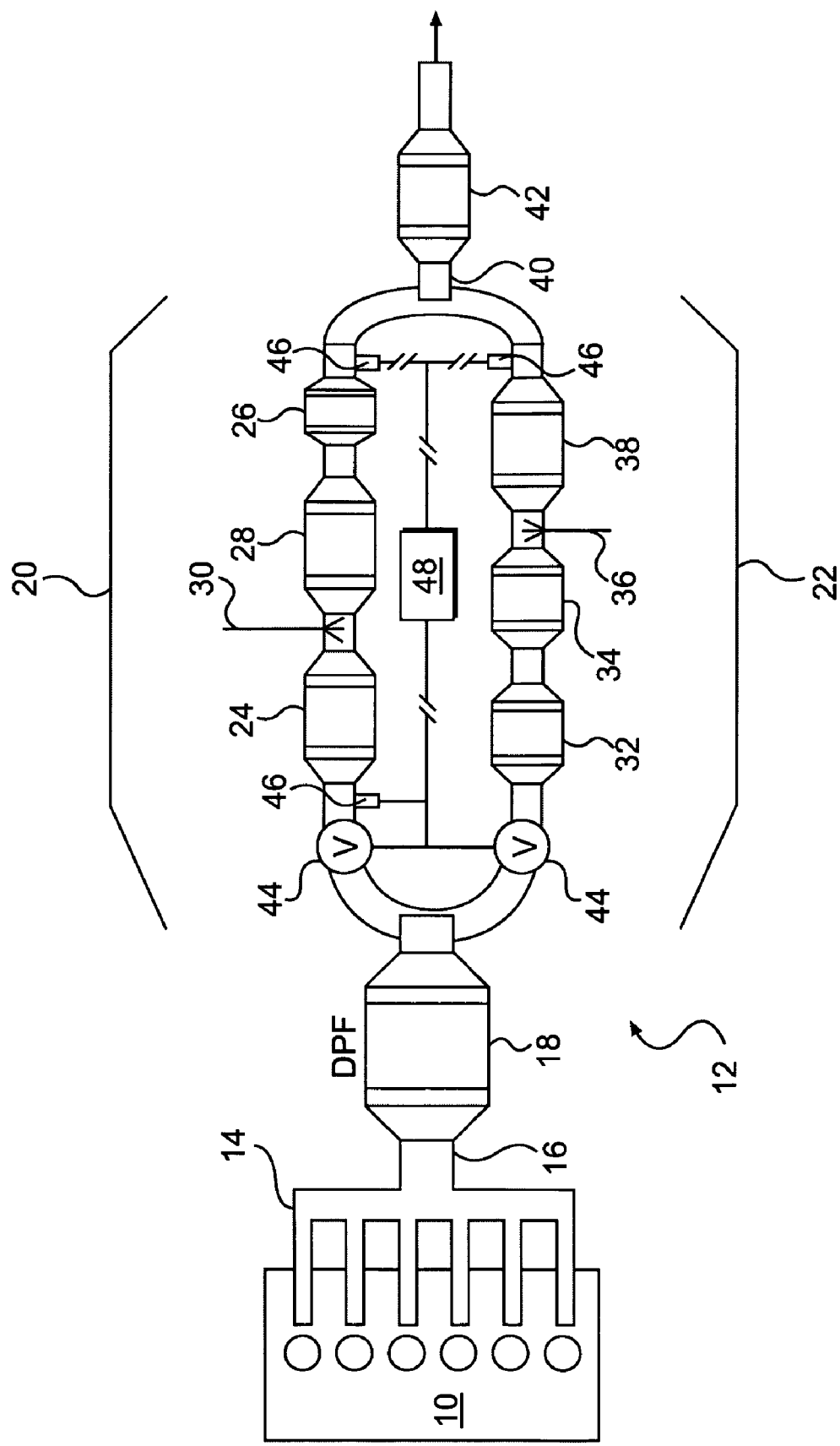
FIG. 1 is a diagrammatic illustration of an engine having an exhaust emission control system according to an exemplary embodiment of the present disclosure.

FIG. 1 illustrates a power source 10 having an exemplary embodiment of a dual path exhaust emission control system 12. Power source 10 may include an engine such as, for example, a diesel engine, a gasoline engine, a gaseous fuel-powered engine, or any other engine apparent to one skilled in the art. Power source 10 may also include any other sources of power, such as a furnace. An exhaust manifold 14 may connect an exhaust flow of power source 10 to a common inlet 16 of the exhaust emission control system 12.

A particulate filter 18 may be located at the inlet 16 of the exhaust emission control system 12. Particulate filter 18 may be configured to remove soot from the flow of exhaust emissions. Particulate filter 18 may be any type of particulate filter known in the art, including a catalyzed or un-catalyzed diesel particulate filter (DPF).

The exhaust control system 12 may regulate the flow of exhaust from power source 10. The exhaust control system 12 may include a first passageway 20 and a second passageway 22. The first and second passageways 20, 22 may be disposed in parallel with each other. First passageway 20 may include an upstream oxidation catalyst 24 and a downstream oxidation catalyst 26. Oxidation catalysts 24, 26 may be devices with porous ceramic honeycomb-like or metal mesh structures coated with a material that catalyzes a chemical reaction to reduce pollution. Oxidation catalysts 24, 26 may oxidize any NO constituents into $NO_2$, which is more susceptible to catalytic treatment. The upstream oxidation catalyst 24 may be a primary oxidation catalyst while the downstream oxidation catalyst 26 may be a secondary and smaller device.

The first passageway 20 may also include one or more conventional lean NOx mechanisms. For example, the conventional lean NOx mechanism may include a lean NOx selective catalytic reduction system 28. Lean NOx selective catalytic reduction system 28 may chemically reduce NOx into $N_2$. In a lean gas flow, lean NOx selective catalytic reduction system 28 may need reductants for the chemical reaction and may utilize a reductant injector 30 to introduce the reductant into the lean gas flow. Reductants employed may be diesel fuel, ethanol, blended fuels, or any other reductant known in the art. It is contemplated that the first passageway 20 may also or alternatively include other known NOx reduction devices, including plasma, UV, microwave, and electrochemical devices. First passageway 20 may further include assisted NOx decomposition devices that do not require reductant injection, if desired.

Second passageway 22 may include on-board ammonia production mechanisms. The on-board ammonia production mechanism may include an oxygen removal/reduction device 32 configured to scavenge oxygen. Oxygen removal/reduction device 32 may consist of materials such as metal mesh or foams made of Calcium and Magnesium and stainless steel alloys. Oxygen removal/reduction device 32 may alternatively consist of carbon/graphite and ceramic. It is also contemplated that oxygen removal/reduction device 32 may further consist of electrochemical devices or any other device known in the art to scavenge oxygen. Oxygen removal/reduction device 32 may remove or scavenge oxygen from the exhaust flow to allow NOx to react with the catalyst, as opposed to any oxygen that may be present in the exhaust flow reacting with the catalyst.

Second passageway 22 may further include a hydrogen generating device 34. Hydrogen generating device 34 may utilize any hydrogen production technology known in the art, including catalytic (water gas shift, hydrocarbon partial oxidation, etc.), electrochemical, plasma, fuel cell, etc. Additional hydrogen may be added in the process of converting NOx into innocuous constituents. For example the additional hydrogen may react with NOx in the presence of catalysts to convert NOx into $N_2$ and water. The chemical reaction involved would be $NO+H_2 \rightarrow N_2+H_2O$.

The second passageway 22 may also include a device 36 for injecting additional hydrocarbon into the second passageway 22. Any injector capable of dispensing hydrocarbons may be employed. The additional hydrocarbon is required for on-board ammonia generation from NO in the presence of a catalyst. The chemical reaction involved is $CxHy+NO \rightarrow NH_3+CO+H_2O$. However, where the hydrogen is produced by water gas shift and not by partial oxidation, the additional hydrocarbon may be eliminated.

The second passageway 22 may also include an ammonia production catalyst 38. Any ammonia production system, such as urea, may be used as the ammonia production catalyst 38.

Exhaust emission control system 12 may include a common passageway 40. Common passageway 40 may be located downstream of the first and second passageways and may include an ammonia selective catalytic reduction system 42.

The exhaust emission control system 12 may also include one or more valves 44 and sensors 46 for regulation of exhaust flow through first and second passageways 20, 22. Valves 44 may be any suitable types of valves known in the art, such as, for example, solenoid valves. That is, in response to an applied current, valves 44 may be selectively moved between flow passing and flow restricting positions. Sensors 46 may embody monitoring devices configured to monitor one or more characteristics of the exhaust emitted from engine 10. For example, one sensor 46 may be configured to measure NOx and $NH_3$ constituents. Sensors 46 may also be configured to generate a signal indicative of the monitored characteristic, and transmit the signal to a controller 48. In particular, sensors 46 may detect characteristics such as the presence of NOx constituents or the amount or concentration of NOx, and generate a signal indicative of the characteristic. Sensors 46 may also or alternatively detect characteristics such as the presence of $NH_3$ constituents or the amount or concentration of $NH_3$. Sensors 46 may further be configured to detect the presence and/or concentration of both NOx and $NH_3$ constituents in the exhaust flow, if desired.

Sensors 46 may be placed downstream of the first and second passageways 20, 22 to detect any NOx and/or $NH_3$ exiting the passageways. Valves 44 may be placed at the inlets of the first and second passageways 20, 22. Sensors 46 may detect the ratio of NOx constituents to $NH_3$ constituents downstream of the first and second passageways right before the exhaust flow enters ammonia selective catalytic reduction system 42. The sensors 46 may be in communication with valves 44 to direct approximately equimolar amounts of NOx and $NH_3$ through ammonia selective catalytic reduction system 42. Alternatively, controller 48 may be configured to ensure that approximately equimolar amounts of NOx and $NH_3$ are entering the ammonia selective catalytic reduction system 42. It is contemplated that sensors 46 may alternatively or additionally be located upstream of the first and second passageways 20, 22, if desired. Similarly valves 44 may alternatively be located downstream of first and second passageways 20, 22 if desired.

Valves 44 and sensors 46 may be in communication with the controller 48. The controller 48 may embody a single microprocessor or multiple microprocessors that include a means for controlling valves 44 in response to signals received from sensors 46. Numerous commercially available microprocessors can be configured to perform the functions of controller 48. It should be appreciated that the controller 48 could readily embody a general engine microprocessor capable of controlling numerous engine functions. The controller 48 may include all the components required to run an application such as, for example, a memory, a secondary storage device, and a processor, such as a central processing unit or any other means known in the art for controlling valves 44 and receiving signals from sensors 46. Various other known circuits may be associated with the controller, including power supply circuitry, signal-conditioning circuitry, solenoid driver circuitry, communication circuitry, and other appropriate circuitry.

INDUSTRIAL APPLICABILITY

The disclosed exhaust emission control system may be applicable to any combustion-type device such as, for example, an engine, a furnace, or any other device known in the art where NOx and emissions must be treated. The disclosed exhaust emission control system may provide a solution for reducing the amount of exhaust emissions discharged to the environment. The operation of dual path exhaust emission control system 12 will now be explained in detail.

Power source 10 may generate a flow of exhaust emissions. Exhaust manifold 14 may direct the generated exhaust emissions to the common inlet 16 of the dual path exhaust emission control system 12. The exhaust flow may then proceed through the particulate filter 18 where soot may be removed. The exhaust flow may then continue to the first passageway 20 and the second passageway 22 based on the ratio of NOx constituents to $NH_3$ constituents present at the outlet of the passageways 20 and 22. For example, sensors 46 may detect the ratio of NOx constituents to $NH_3$ constituents present and transmit a signal representing the ratio to controller 48. Based on the signal, the controller 48 may determine how much exhaust flow enters the first passageway 20 and how much enters the second passageway 22.

The controller 48 may determine how much exhaust flows to the first passageway 20 and how much exhaust flows to the second passageway 22. The controller 48 may be in communication with valves 44, and may control the opening and closing of valves 44. The controller 48 may also be in communication with sensors 46 and determine, based on the detected characteristic of the exhaust flow, the concentration of NOx and $NH_3$ constituents present. The controller 48 may utilize the detected concentration to control how much exhaust (if any) flows to each of the first and second passageways 20, 22. For example, the controller 48 may direct most of the exhaust flow to the first passageway 20 if the ratio of NOx constituents to $NH_3$ constituents is less than 1 and direct most of the exhaust flow to the second passageway 22 when the ratio of NOx constituents to $NH_3$ constituents is greater than 1.

In the first passageway 20, the exhaust may flow through the upstream oxidation catalyst 24 where any NO may be converted into $NO_2$. Upon leaving the upstream oxidation catalyst 24, the exhaust flow may proceed to the lean NOx selective catalytic reduction catalyst 28 that utilizes reductant from injection device 30. Injection device 30 may inject hydrocarbons into the exhaust flow that may react with $NO_2$ in the presence of catalysts to convert $NO_2$ into $N_2$. The exhaust flow may then flow through downstream oxidation catalyst 26. The downstream oxidation catalyst 26 may convert any left over NOx into $NO_2$.

In the second passageway 22, the exhaust flow may proceed to the oxygen reduction/removal device 32 that functions as an oxygen scavenger. The oxygen removal/reduction device 32 may remove or scavenge oxygen from the exhaust flow to allow NOx to react with the catalyst, as opposed to any oxygen that may be present in the exhaust flow reacting with the catalyst. The oxygen depleted exhaust may then flow to the hydrogen generating device 34. The additional hydrogen may react with NOx in presence of catalysts to convert NOx into $N_2$ and water. The hydrogen rich exhaust flow may then proceed to the ammonia production catalyst 38. Additional hydrocarbon may be injected into the flow via the injector 36. The additional hydrocarbon may be required for on-board ammonia generation from NO in the presence of a catalyst ($CxHy+NO \rightarrow NH_3+CO+H_2O$).

The exhaust flow from the first passageway 20 and the second passageway 22 may exit through common passageway 40 and proceed to the ammonia selective catalytic reduction catalyst 42 for final treatment before being exhausted to the atmosphere or being directed to a recirculation system (not shown). The ammonia selective catalytic reduction catalyst 42 may treat any left over NOx and $NH_3$ constituents before exiting the exhaust flow to the atmosphere.

The dual path exhaust emissions control system 12 may provide a mechanism for removing NOx and particulate matter from exhaust emissions. Because the dual path exhaust emissions control system 12 may employ both conventional lean-NOx mechanisms as well as on-board ammonia mechanisms, the exhaust emissions control system 12 benefits from the capabilities of both conventional lean-NOx mechanisms and on-board ammonia mechanisms. Consequently exhaust emissions control system 12 will be effective particularly in instances where either conventional lean-NOx mechanisms or on-board ammonia mechanisms alone is ineffective. In addition, because the dual path exhaust emissions control system 12 utilizes a split flow where one flow includes a conventional lean-NOx mechanisms and the other flow onboard ammonia mechanisms, and the controller 48 may control the flow of exhaust into these flows based on their constituents, the exhaust emission control system may more efficiently convert harmful NOx gas into innocuous constituents.

It will be apparent to those skilled in the art that various modifications and variations can be made to the disclosed emission control system. Other embodiments will be apparent to those skilled in the art from consideration of the specification and practice of the exhaust emission control system. For example, rather than splitting the exhaust into two passageways, the exhaust may be split into any number of passageways. Each passageway may include either conventional lean NOx treatment mechanisms exclusively, on-board ammonia production mechanisms exclusively, or a combination of the two. In addition, controllers in communication with valves 44 and sensors 46 may direct exhaust flows to the plurality of passageways according to different algorithms. Thus, it is intended that the specification and examples be considered as exemplary only, with a true scope being indicated by the following claims and their equivalents.

What is claimed is:

1. A power system comprising:
    an engine configured to combust a fuel/air mixture to produce power and a flow of exhaust;
    a common inlet disposed to receive the flow of exhaust, the common inlet including a particulate filter;
    a first passageway configured to receive exhaust from the common inlet;
    a second passageway configured to receive exhaust from the common inlet in parallel with the first passageway;
    a common downstream passageway configured to receive exhaust from both the first and second passageways, the common downstream passageway including a selective catalytic reduction device;
    a valve arrangement configured to regulate the flow of exhaust to the first and second passageways;
    at least one sensor configured to sense a parameter indicative of a constituent of the exhaust and to generate a corresponding signal; and
    a controller in communication with the valve and the at least one sensor, the controller configured to affect operation of the valve arrangement and control flow through the first and second passageways in response to the signal.

2. The power system of claim 1 further including:
    a lean-NOx mechanism disposed in the first passageway; and
    an on-board ammonia production mechanism disposed in the second passageway.

3. The power system of claim 1 wherein the at least one sensor is disposed in at least one of the first passageway and the second passageway.

4. The power system of claim 1 wherein a reductant injector is positioned upstream of the selective catalytic reduction device.

5. The power system of claim 1 wherein the second passageway includes a hydrocarbon injector disposed upstream of an ammonia production catalyst.

6. The power system of claim 1 wherein the signal received from the sensor is indicative of NOx and $NH_3$ concentrations in the flow of exhaust.

7. The power system of claim 6 wherein the controller is configured to direct a majority of the exhaust flow to the first passageway if the ratio of NOx constituents to $NH_3$ constituents is less than 1 and direct a majority of the exhaust flow to the second passageway if the ratio of NOx constituents to $NH_3$ constituents is greater than 1.

8. The power system of claim 6 wherein the controller is configured to affect operation of the valve arrangement such that approximately equimolar amounts of NOx and $NH_3$ enter the selective catalytic reduction device.

9. The power system of claim 1, wherein the second exhaust passageway includes an on-board ammonia production mechanism and the constituent is NOx.

10. The power system of claim 9, wherein the on-board ammonia production mechanism includes an oxygen reduction device.

11. The power system of claim 9, wherein the on-board ammonia production mechanism includes a hydrogen generating device.

12. The power system of claim 9, wherein the on-board ammonia production mechanism includes an ammonia production catalyst.

13. The power system of claim 1, wherein the first exhaust passageway includes a lean-NOx mechanism and the constituent is NOx.

14. The power system of claim 13, wherein the lean-NOx mechanism includes a NOx reduction device.

15. The power system of claim 13, wherein the lean-NOx mechanism includes an oxidation catalyst.

16. The power system of claim 13, wherein the lean-NOx mechanism includes a selective catalytic reduction device.

17. The power system of claim 16 wherein the lean-NOx mechanism includes a primary oxidation catalyst disposed upstream of the selective reduction catalyst and a secondary oxidation catalyst disposed downstream of the selective reduction catalyst.

* * * * *